United States Patent [19]

Gomes

[11] Patent Number: 4,482,186

[45] Date of Patent: Nov. 13, 1984

[54] JOINTED ARTICLE OF FURNITURE

[75] Inventor: Daniel Gomes, Bloomington, Ind.

[73] Assignee: Abra Inc., Bloomington, Ind.

[21] Appl. No.: 371,604

[22] Filed: Apr. 26, 1982

[51] Int. Cl.³ .......................... A47C 4/30; A47C 7/62; F16C 11/04

[52] U.S. Cl. .................................. 297/441; 297/192; 297/226; 297/403; 297/457; 16/379; 16/380; 403/162

[58] Field of Search .............. 297/441, 457, 188, 192, 297/403, 226; 403/91, 119, 161, 162, 14; 16/378–380, 386; 384/280, 281, 299

[56] References Cited

U.S. PATENT DOCUMENTS

| | | | |
|---|---|---|---|
| 778,413 | 12/1904 | Kilmon | 16/386 X |
| 2,615,501 | 10/1952 | Neiborn | 297/403 X |
| 2,701,384 | 2/1955 | Barroero | 16/378 |
| 2,964,341 | 12/1960 | Doyle et al. | 403/162 |
| 3,151,909 | 10/1964 | Gerdetz | 297/188 |
| 3,539,234 | 11/1970 | Rapata | 403/119 X |

FOREIGN PATENT DOCUMENTS

| | | | |
|---|---|---|---|
| 2316899 | 3/1977 | France | 297/441 |
| 520313 | 4/1940 | United Kingdom | 297/441 |
| 765094 | 1/1957 | United Kingdom | 297/441 |

Primary Examiner—William E. Lyddane
Assistant Examiner—Peter R. Brown
Attorney, Agent, or Firm—Barnes & Thornburg

[57] ABSTRACT

An article of furniture includes frame members, a seat member supported on the frame member, a concealed joint for pivotally coupling two frame members to each other, and an attachment for coupling the seat to the frame members. The two frame members include truncated bores for concealing the joint. The pivotal joint includes a pair of connecting members which are received in the truncated bores in fixed relationship to the frame members. Each connecting member has an opening for receiving a bearing member. A retainer is inserted through the bearing member and engages both connecting members to prevent lateral separation of the frame members. Each connecting member is independently rotatable on the bearing member. The seat attachment includes an opening in proximity to the edge of the seat member, a seat support member carried on the frame members, a slot in the support member having an upwardly facing shoulder, and a rod insertable through the opening in the seat member which seats on the shoulder to couple the seat member to the frame members.

15 Claims, 6 Drawing Figures

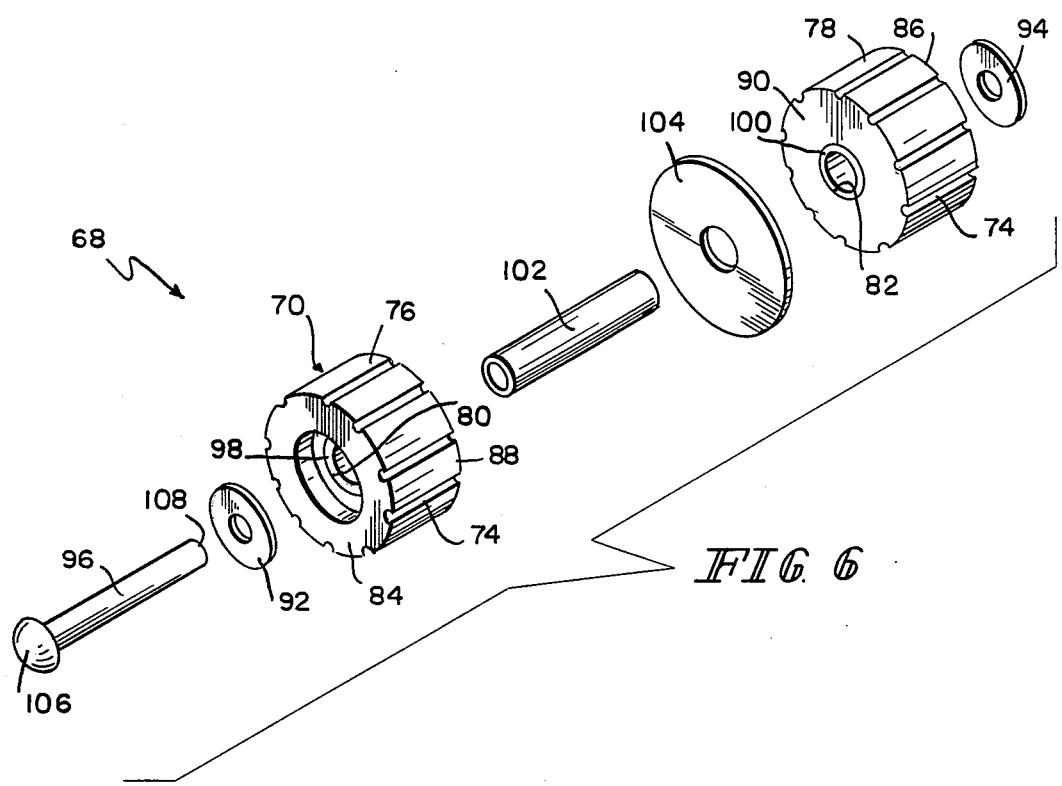

JOINTED ARTICLE OF FURNITURE

This invention relates to articles of furniture having movable parts, and more particularly to improvements in pivot joints and attachments employed to interconnect various members to the article of furniture.

Articles of furniture having frame members which pivot about each other are well known in the prior art. Heretofore, the pivot joints have created problems for both the manufacturers and users of the furniture. Many of the problems can be attributed to the fact that the joints are made of materials which are incompatible with and cannot be easily bonded to the material of the frame members. This adhesion incompatibility between the material of the joint and the frame members results in construction weakness and joint failure.

Typically, a pivot joint is made by using a metal T-bolt or rivet which is inserted through corresponding holes drilled in wooden frame members. A nut or possibly a nut and a lock washer are secured to the bolt to retain it in the hole. Besides the aesthetically displeasing appearance of T-bolts, the bolt and nut often work themselves loose. This requires frequent tightening of the bolt, and in some cases results in the loss of the bolt. A rivet requires crimping or other manufacturing processes to retain it in the hole. These manufacturing processes usually cannot be performed by the user; thus, rivets cannot be used in kits where the user assembles the various members. Exposure to weather will many times cause the T-bolt, nut, or rivet to rust, thereby further detracting from the aesthetic appearance of the article of furniture.

The use of T-bolts also adds to assembly time and manufacturing costs. It is time-consuming to install a T-bolt at all necessary joints, and then to affix and tighten the nuts to each of the bolts. While rivets are more commonly used as pivot joints because they are easier to assemble than T-bolts, they cannot be provided in kits and they also have many of the same deficiencies as T-bolts, e.g., aesthetic appearance and adhesion incompatibility with the material of the frame members. The pivot joint of the present invention eliminates these and other problems heretofore associated with jointed articles of furniture. An article of furniture which includes pivot joints embodying the present invention requires less time to assemble, is cheaper to manufacture, and is aesthetically more pleasing because they are hidden from view.

Another aspect of this invention relates to attachment means for attachng parts to the furniture such as seats, pillows, and pouches.

In most chairs, the seat members are permanently attached to frame members by hems, staples, bolts, or the like. Thus, the attachment does not facilitate adjustment and replacement of the seat member. If the seat member becomes ripped or broken, the article of furniture is either discarded or must be taken to a repairman for replacement of the seat member. The chair may be uncomfortable to many users because either the seat well or seat back are not adjustable. A seat-attachment means embodied in the present invention facilitates removal of the seat member for cleaning, replacement, storage, etc, and adjustment of the seat well and back to accommodate individuals of various sizes. The attachment means also enables the user to attach accessory appendages, such as pillows and pouches, to an article of furniture. For example, in a chair, a pillow can be attached in a manner which will allow it to be placed in a position where it can be used as a headrest, back (lumbar) cushion, or placed in a storage position. Further, a pouch can be attached which will serve to hold the user's cigarettes, keys, or books.

Articles of furniture embodying the pivot joint and/or attachment means of the present invention are both more aesthetically pleasing and functionally superior to joints and attachment means known in prior art.

One object of the present invention is to provide an article of furniture with pivotally jointed frame members which is aesthetically pleasing, rustproof, and durable.

A further object of the present invention is to provide a jointed article of furniture which is easy and relatively inexpensive to manufacture.

Another object of the present invention is to provide an article of furniture with a seat member which is easily removed for cleaning, replacement, storage, etc., but securely attached to the furniture frame when in use.

According to the present invention, a jointed article of furniture includes a flexible seat, a frame including cross frame members and lateral frame members, attachment means for attaching the seat to the frame, and pivotal joints for pivotally connecting frame members to each other. The pivotal joints embodied in the present invention include a pair of dowels which are sized and shaped to be press-fitted into recesses in the frame members. Each dowel includes a cylindrical bore extending axially therethrough for rotatably receiving a cylindrical sleeve. The dowels are joined to allow rotation about the sleeve relative to each other and to prevent their lateral separation. The seat attachment means embodied in the present invention includes at least one cylindrical opening near the end portion of the seat member, a rod for insertion in the cylindrical opening, and elongated slots in the frame of the article of furniture for receiving the rods to secure the seat member to the frame.

Various features and advantages of the present invention will become apparent in view of the following detailed description of an embodiment thereof exemplifying the best mode of carrying out the invention as presently perceived, which description should be considered in conjunction with the accompanying drawings, in which:

FIG. 6 is an exploded view of the pivot joint shown in FIG. 5.

For purposes of illustrating the present invention, a rockerless rocker is shown as the article of furniture 10. However, the present invention may be adapted to various jointed articles of furniture without departing from its scope. Thus, it is not intended that the invention be limited to any particular article of furniture.

Figure 1:
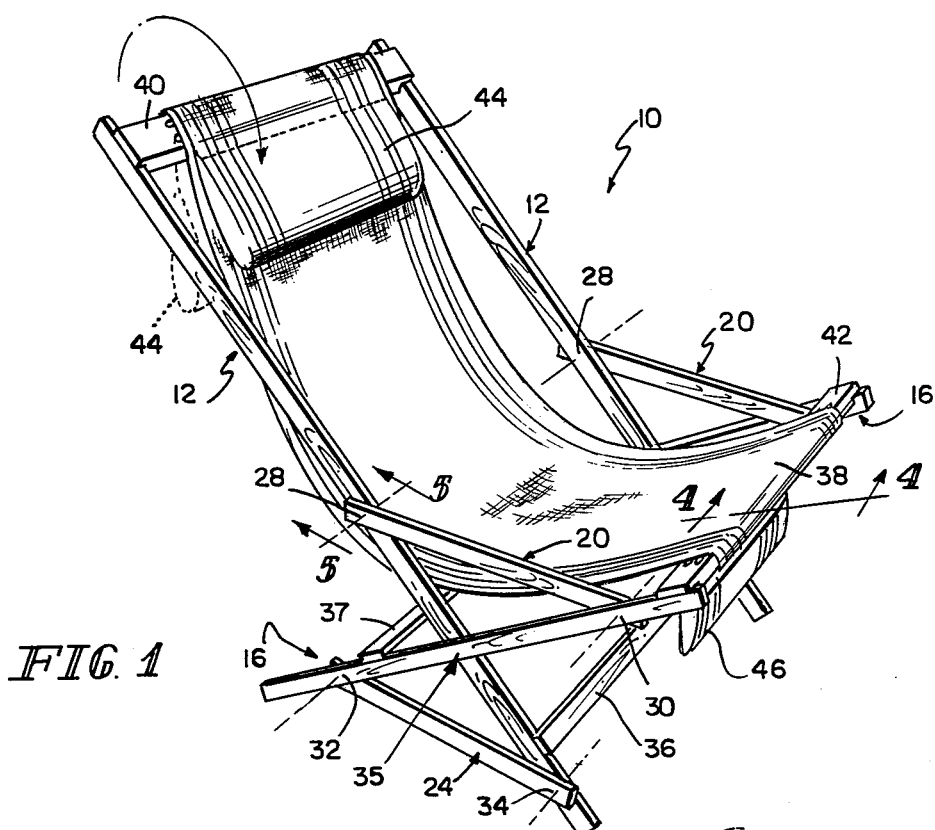
FIG. 1 is a perspective view of an article of furniture embodying the present invention.

Referring now to FIG. 1, the article of furniture 10 having jointed members pivotally movable with respect to each other includes a first pair of side frame members 12 and a second pair of frame members 16. First frame members 12 are pivotally joined to second frame members 16 by upper struts 20 and lower struts 24. Upper strut 20 pivotally joins frame member 12 to frame member 16 at pivot connections 28 and 30. Lower strut 24 pivotally joins frame member 12 to frame member 16 at pivot connections 32 and 34. In the illustrative embodiment, struts 20 and 24 are pivotally connected to the outer surface of frame member 12, and pivotally connected to the inner surface of frame member 16. Thus, frame member 12 and frame member 16 are maintained in a spaced parallel relationship which enables them to move relative to each other at a cross or junction point 35 without rubbing.

It should be noted that frame members 12, 16 are not joined at cross point 35, and that cross point 35 is not a fixed point about which frame members 12, 16 pivot. Rather, cross point 35 only represents the point of intersection of frame members 12, 16 as they move relative to each other in response to the pivoting of the frame members 12, 16 and struts 20, 24 about pivot connections 28, 30, 32, 34.

Base braces 36, 37 join the first pair of side frame members 12 and the second pair of side frame members 16, respectively, near the lower end of the frame members 12, 16. The braces 36, 37 serve to maintain a spaced parallel relationship between the side frame members 12, 16 on one side of the chair 10 and the side frame members 12, 16 on the other side. The braces 36, 37 also serve to strengthen the structure of the chair 10.

The article of furniture further includes a seat 38 made of flexible sheet-like material. One of the ends of the seat 38 is attached to an upper brace 40 and the other end is attached to a lower brace 42 so that a seat sling is provided having a seat well and a seat back. A pillow 44 is attached to upper brace 40 and is movable between a usable position on the seat back, as shown by the solid lines in FIG. 1, and a storage position behind the seating area as shown by the dotted lines in FIG. 1. A pouch 46 is attached to lower brace 42. Pouch 46 may be used to store books, cigarettes, keys, or other articles. While a pillow 44 and pouch 46 have been shown as examples of accessory appendages which may be attached to the article of furniture 10, other appendages, such as a back (lumbar) cushion and seat cushion, could be attached without departing from the scope of the invention.

Figure 2:
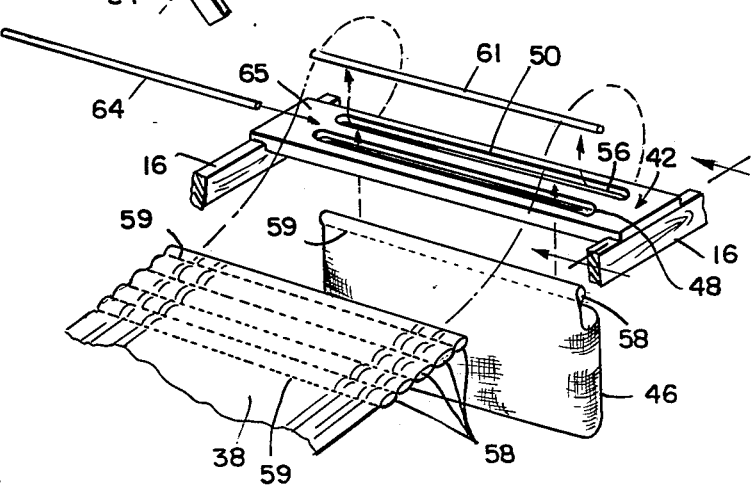
FIG. 2 is an exploded view of a portion of the article of furniture showing the seat and accessory attachments to the frame.
Figure 4:
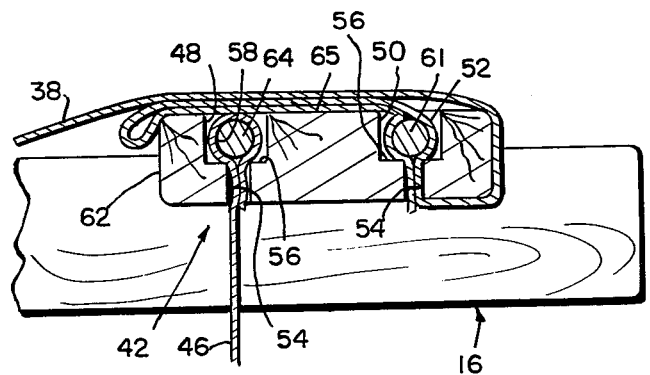
FIG. 4 is a cross-sectional view of the article of furniture shown in FIG. 1, taken generally along lines 4—4 of FIG. 1.

Referring now to FIG. 2, one of the two seat and accessory attachment means embodied in the present invention is shown. It will be appreciated that both attachment means have the same construction. The lower brace 42 serves as a seat and accessory support member, and is securely attached to frame member 16 generally perpendicular thereto. Two longitudinal slots 48, 50 are provided in the brace 42 in spaced parallel relationship to each other. As shown in FIG. 4, the slots 48, 50 include an upper section 52, a lower section 54, and an intermediate shoulder section 56.

Figure 3:
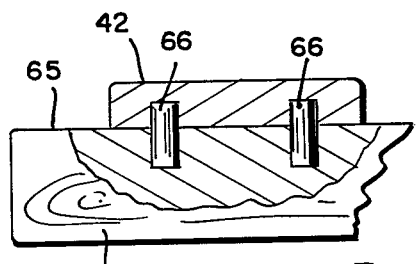
FIG. 3 is a fragmentary view, partly cross-sectioned, of the article of furniture shown in FIG. 1, taken generally lines 3—3 of FIG. 2.

Referring now to FIG. 3, lower brace 42 is attached to side frame members 16 employing pegs 66 which are securely received into openings on the underside of lower brace 42 and on the upper side of side frame member 16. In the illustrative embodiment, pegs 66 are made of wood, as are frame members 16, and lower brace 42. The pegs 66 are secured to lower brace 42 and frame member 16 by applying glue to the surface of the pegs 66 or to the openings into which they are received, inserting the pegs 66 into the openings on either the frame member 16 or lower brace 42, and then mating the openings on the member not containing the pegs 66 to the pegs 66 which are gluded in the openings of the other corresponding member. Upper brace 40 is also attached to frame members 12 in this manner. It will be appreciated that the braces or support members 40 and 42 may be attached to the side frame members 12 and 16 employing other conventional means without departing from the scope of the present invention.

One feature of the accessory attachment means embodying the present invention is that the attachment between the braces 40 and 42 and the side frame members 12 and 16 can be made permanent, while the seat 38 can still be easily adjusted and/or removed. This feature makes the furniture 10 more durable and simpler to maintain. Heretofore, the attachment between the seat support braces 40 and 42 and the frame members 12 and 16 could not be made permanent if the seat 38 was to be adjustable or removable.

Referring now to FIGS. 2 and 4, the seat 38, pillow 44, and accessory pouch 46 are attached in the following manner. For illustrative purposes, FIGS. 2 and 4 show the attachment of seat 38 and pouch 46 to the lower brace 42. However, it will be appreciated that seat 38 and pillow 44 are attached to upper brace 40 in a like manner. Seat 38, pillow 44, and pouch 46 are made of flexible material. Cylindrical openings 58 are provided in one end of both the pillow 44 and pouch 46 and in both ends of the seat sling 38. The openings 58 extend in substantially the same direction as the longitudinal slots 48, 50 in the braces 40 and 42 and are continuous from one side edge of the seat material to the other. As can best be seen in FIG. 2, there can be a single cylindrical opening 58, as shown in the pouch 46, or a series of cylindrical openings 58 as shown in the seat sling 38. The plurality of cylindrical openings 58 in seat 38 provides an adjustment means for the seat 38, as will be explained later.

The cylindrical openings 58 are preferably made by overlapping the end of the material forming the seat sling 38 and sewing seams 59 across the material. The seams 59 are sewed substantially parallel to each other, and are spaced far enough apart to provide space for the insertion of a rod 61. The rod is sized and shaped to be small enough to be received by the upper section 52 of the longitudinal slot 50 in the brace 42, but large enough so that it will not pass through the lower section 54 of the longitudinal slot 50, when the rod is inserted into one of cylindrical openings 58 in the seat sling 38.

As shown in FIGS. 2 and 4, the end of the seat sling 38 including the cylindrical openings 58 is extended over the brace 42, around the front edge of the brace 42, and up through longitudinal slot 50 from the bottom of the brace 42. The end of seat 38 is pulled far enough through the slot to achieve the adjustment desired by the user. The rod 61 is then inserted into one of the cylindrical openings 58. The seat 38 is then pulled back through the longitudinal slot 50 until the rod 61 sits on the intermediate shoulder section 56 of the longitudinal slot 50. The shoulder 56 and narrowed lower section 54 of longitudinal slot 50 prevent the rod from being pulled completely back through the brace 42. The weight of the occupant of the seat 38 will force rod 61 against the shoulder 56 so that it remains firmly seated in the longitudinal slot 50.

If the rod 61 is inserted into a cylindrical opening other than the opening 58 closest to the end of the seat sling 38, some material will hang out of the longitudinal slot 50, as shown in FIG. 4. This overhang can be folded back under the seat sling 38. In this manner, the overhanging portion of the end of the seat 38 is hidden from view, as it is covered by remaining seat 38 material.

Pouch 46 is attached to the lower brace 42 by first inserting the end of the pouch 46 including the opening 58 upward through the bottom of the slot 48 in brace 42 and inserting a rod 64 into the opening 58. By pulling downward on the pouch 46, the rod 64 seats on the shoulder section 56 of the slot 48 in a manner similar to rod 61 in slot 50. As shown in FIG. 4, rod 64 and cylindrical opening 58 are hidden from view by the overlap of seat 38 on the upper edge 65 of the lower brace 42.

Figure 5:
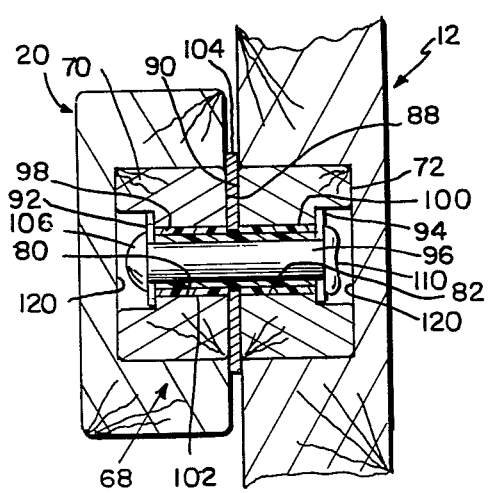
FIG. 5 is a cross-sectional view of a portion of the article of furniture, taken generally along lines 5—5 of FIG. 1 showing the pivot joint embodying the present invention.

Referring now to FIGS. 5 and 6, a pivot mechanism 68 embodying the present invention includes a pair of dowels 70, 72. In the illustrative embodiment, the dowels 70, 72 are cylindrically shaped, and a plurality of radially spaced-apart troughs or notches 74 extend axially on the circumferential surfaces 76 and 78 of the dowels 70, 72, respectively. The circumferential surfaces 76 and 78, however, may be of any shape desired by the manufacturer. Furthermore, the troughs 74 could be cut in other shapes, such as a spiral, as is commonly done without departing from the scope of the present invention. Dowels 70, 72 include cylindrical bores 80, 82 which extend axially through the center of the dowels 70, 72. Cylindrical bores 80, 82 are not of uniform circumference throughout their length. In proximity to the axially outer surfaces 84, 86 of the dowels 70, 72, the bores 80, 82 have a greater diameter than the diameter of the remainder of the bores 80, 82. Thus, the diameter of the bores 80, 82 in proximity to the axially inner surfaces 88, 90 is less than the diameter of the bores 80, 82 at the axially outer surfaces 84, 86. The enlarged diameter near the axially outer surfaces 84, 86 is sized to receive retaining washers 92, 94. Retaining washers 92, 94 each include an opening having an inner diameter which is sized to receive a post or rivet 96.

In the illustrative embodiment, sleeves 98, 100 are inserted into the cylindrical bores 80, 82 and extend partially therethrough. The outer surface of the sleeves 98, 100 is sized to be snugly received by the smaller-diametered portion of the cylindrical bores 80, 82. The sleeves 98, 100 are of sufficient length to extend along the smaller-diametered portions of the cylindrical bores 89, 82 but not so long so as to extend into the wider-diametered portion of the cylindrical bore 80, 82. Cylindrical bearing 102 is sized to be rotatably received in the sleeves 98, 100 and washer 104, and to rotatably receive the post or rivet 96. The bearing 102 is of sufficient length to extend through the sleeves 98, 100 and washer 104 when the pivot mechanism 68 is assembled as is shown in FIG. 5. Preferably, sleeves 98, 100 are made of a material different than bearing 102 so that sleeves 98, 100 and bearing 102 may rotate relative to each other with a minimum degree of friction. In bearings of this type, it is desirable that one of the bearing surfaces (either on the sleeves 98, 100 or on the bearing 102) be softer than the other bearing surface. It has been found that a nylon bearing 102 and teflon or delrin sleeves 98 and 100 satisfactorily achieve this objective, although other similar types of material may be used, keeping in mind the desirable difference in materials between the bearing 102 and sleeves 98 and 100. Washer 104 has an outer diameter which is slightly greater than the outer diameter of dowels 70, 72. Washer 104 serves to separate the axially inner surfaces 88, 90 of dowels 70, 72, and acts as an entering stop when the dowels 70, 72 are press-fitted into the frame members. Washer 104 should be made of a non-corrosive material, such as brass or plastic.

It will be appreciated that the pivot mechanism 68 may be constructed without the sleeve inserts 98 and 100. In the alternative embodiment, bearing 102 would be inserted into the bores 80 and 82. The bearing 102 would be primarily rotatable about the post or rivet 96. One advantage of sleeve inserts 98 and 100 is that they facilitate rotation of the dowels 70 and 72 relative to the bearing 102, thus increasing the efficiency of operation of the mechanism 68, and they also provide longer wear. Further, post 96 and bearing 102 could be a single unit constructed of nylon, and be used either with or without sleeves 98 and 100. The combined post 96 and bearing 102 unit could be provided with a head on one end and the other end deformed by heat to retain the dowels 170 and 72 thereon.

In assembling the mechanism 68, sleeves 98, 100 are inserted into cylindrical bores 80, 82. Bearing 102 is inserted through washer 104 and into the sleeves 98, 100. Dowels 70, 72 are pushed toward each other, and are separated and centered by the washer 104. Post 96 passes through retaining washer 92, bearing 102, and retaining washer 104, placing the dowels 70, 72 in proper relation to each other. Post 96 contains a head 106 and a distal end 108. When pivot mechanism 68 is fully assembled, the distal end 108 of post 96 protrudes slightly past the retaining washer 94. The distal end 108 includes attachment means for retaining the dowls 70 and 72 on the post 96 in proximal relationship to each other. The attachment can be achieved by crimping the distal end 108 of the post 96, as is shown in FIG. 5 at 110, or by using a threaded nut or screw (not shown) and a lock washer (not shown). With a combined post 96 and bearing 102 unit, attachment can be achieved by heat-treating one or both of the ends of the combined unit. Dowels 70, 72 are preferably made of a material which has adhesion compatability with the material of the frame members 12 and 16. This adhesion compatability should provide good bonding surfaces between the dowels 70 and 72 and the frame members 12 and 16 for ease and permanence of assembly. In the illustrative embodiment, the dowels 70 and 72 are made of wood and the frame membes 12 and 16 are also made of wood. Thus, the materials of the dowels 70 and 72 and frame members 12 and 16 have good adhesion compatibility. However, other materials could be used having adhesion compatability to produce a durable and permanent connection without departing from the scope of the invention.

Referring to FIG. 5, the pivot mechanism 68 is shown when fully assembled and operational. Frame member 12 and upper strut 20 contain recesses or truncated bores 120 which are sized and shaped to receive dowls 70 and 72. Pivot mechanism 68 is securely attached to frame member 12 and strut 20 by applying glue to the circumferential surfaces 76, 78 of dowels 70, 72 and to the inner surface of the truncated bores of frame member 12 and strut 20. The dowels 70 and 72 are press-fitted into the truncated bores 120. The dowels 70, 72 should be held securely in the truncated bores 120 to prevent rotation of the dowels 70, 72 relative to the frame member 12 and strut 20, and further to prevent lateral separation of the frame member 12 and strut 20. Since the dowels 70, 72, the strut 20, and the frame member 12 are made of materials which are compatabile for adhesion and bonding, a glue will serve to secure the dowels 70, 72 in the truncated bores 120. The dowels 70, 72 are held statically in strut 20 and frame member 12, respectively. Therefore, any movement of dowel 70, 72 will be possible only through movement of strut 20 or frame member 12. Bearing 102, however, is rotatable in sleeves 98, 100, thereby allowing frame members 12, frame members 16, and struts 20 and 24 to rotate relative to each other. Washer 104 serves as a spacer to maintain a separation between strut 20 and frame member 12, thereby enhancing the rotatability of strut 20 with respect to frame member 12 and minimizing the friction between axially inner surfaces 88 and 90 of the dowels 70 and 72 and the adjacent surfaces of the frame members 12 and 16 to prevent surface scratching or rubbing.

As described above, the manufacturing process for the article of furniture is enhanced by the ease with which the pivot assembly 68 can be assembled. Further, use of the pivot assembly 68 enables all joints to be hidden and thus improves the aesthetic appearance of the article of furniture. Any metal portions of the joint are concealed and protected against exposure to the environment. Thus, they are protected from rust, and any rust which may form is concealed. The use of dowels 70, 72 constructed of material which is compatible for adhesion and bonding the frame members 12, 16 and struts 20, 24 provides for secure attachment of the pivot assembly 68 to the respective frame components without the use of nails, screws, staples, or other mechanical attachment means.

What is claimed is:

1. An article of furniture, comprising frame members, a seat member supported on the frame members, a pivotal joint for pivotally coupling first and second frame members to each other, the first and second frame members each including a truncated bore, the pivotal joint including two connecting means for engaging the truncated bores in fixed relationship to the first and second frame members, each connecting means including an axially extending opening, a bearing member received in the openings of the two connecting means, retaining means engaging the two connecting means to prevent lateral separation thereof, the connecting means being independently rotatable relative to the bearing member, attachment means for attaching the seat member to the frame members, the attachment means including two seat support members connected to the frame members, each support member including an elongated slot for receiving an end of the seat member, each slot including a shoulder, and a rod removably coupled to the end of the seat member for seating on the shoulder in the slot.

2. An article of furniture as recited in claim 1 wherein each seat support member includes at least two slots, one for attaching the end of the seat member and the other for attaching an accessory.

3. An article of furniture as recited in claim 1, further comprising first and second bushings received in the openings in the two connecting means for receiving the bearing member.

4. An article of furniture as recited in claim 3 wherein one of the bearing member and bushings is fabricated from a material which is softer than the material of the other.

5. An article of furniture as recited in claim 4 wherein one of the bearing member and bushings is fabricated of nylon, and the connecting means and frame members are fabricated of materials having bonding compatibility.

6. An article of furniture as recited in claim 1 wherein the two connecting means and frame members are fabricated of materials having bonding compatibility.

7. An article of furniture as recited in claim 1 wherein the connecting means are cylindrical-shaped wooden dowels, each dowel having a peripheral surface including a plurality of notches and the frame members are fabricated of wood.

8. An article of furniture as recited in claim 1 wherein the bearing member includes a tubular sleeve and the retaining means includes a post extending through the tubular sleeve, each dowel having an axially outer surface including a recess for receiving a portion of the post.

9. An assembly for rotatably coupling two members to each other to produce a concealed pivot joint, the assembly comprising truncated bores in the two members to be joined, two connecting means for engaging the bores in fixed relationship to the two members, each connecting means including an opening extending therethrough, a bearing member received in the openings of the two connecting means, and retaining means engaging the two connecting means to prevent lateral separation thereof, the two connecting means being independently rotatable relative to the bearing member to allow relative rotation of the two connecting means.

10. An article of furniture as recited in claim 9, further comprising first and second bushings received in the openings in the two connecting means for receiving the bearing member.

11. An article of furniture as recited in claim 10 wherein one of the bearing member and bushings is fabricated from a material which is softer than the material of the other.

12. An article of furniture as recited in claim 11 wherein one of the bearing member and bushings is fabricated of nylon, and the connecting means and the two members are fabricated of materials which are compatible for purposes of bonding the connecting means to the frame members.

13. An article of furniture as recited in claim 9 wherein the two connecting means and the two members are fabricated of materials which are compatible for purposes of bonding the connecting means to the frame members.

14. An article of furniture as recited in claim 9 wherein the connecting means are cylindrical-shaped wooden dowels, each dowel having a peripheral surface including a plurality of notches and the two members are fabricated of wood.

15. An article of furniture as recited in claim 9 wherein the bearing includes a tubular sleeve and the retaining means includes a post extending through the tubular sleeve, each dowel having an axially outer surface including a recess for receiving a portion of the post.

* * * * *